(12) United States Patent
Sriramadhesikan et al.

(10) Patent No.: US 8,418,138 B2
(45) Date of Patent: Apr. 9, 2013

(54) METHOD, SYSTEM AND COMPUTER-USABLE MEDIUM FOR TRACKING AND RECORDING MODIFICATIONS TO A SOFTWARE SOLUTION

(75) Inventors: Sampath K. Sriramadhesikan, Burlington, MA (US); Sarmistha Samantaray, Lexington, MA (US); Manjunath D. Makonahalli, Acton, MA (US); Xinyu Wu, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 1498 days.

(21) Appl. No.: 11/936,383

(22) Filed: Nov. 7, 2007

(65) Prior Publication Data

US 2009/0119643 A1    May 7, 2009

(51) Int. Cl.
*G06F 9/44* (2006.01)
(52) U.S. Cl. .......................... 717/121; 717/122; 717/127
(58) Field of Classification Search .......................... None
See application file for complete search history.

(56) References Cited

U.S. PATENT DOCUMENTS

| | | | |
|---|---|---|---|
| 6,256,773 B1 | 7/2001 | Bowman-Amuah | 717/1 |
| 6,698,013 B1* | 2/2004 | Bertero et al. | 717/127 |
| 7,216,341 B2 | 5/2007 | Guarraci | 717/127 |
| 7,472,374 B1* | 12/2008 | Dillman et al. | 717/102 |
| 7,631,006 B2* | 12/2009 | Hagstrom et al. | 1/1 |
| 7,676,793 B2* | 3/2010 | Himmer et al. | 717/122 |
| 7,703,074 B2* | 4/2010 | Kamen et al. | 717/122 |
| 7,793,266 B2* | 9/2010 | Alpern et al. | 717/127 |
| 7,836,429 B2* | 11/2010 | Clemm et al. | 717/121 |
| 2003/0188290 A1* | 10/2003 | Corral | 717/101 |
| 2004/0221267 A1* | 11/2004 | Chase et al. | 717/121 |
| 2005/0120106 A1 | 6/2005 | Albertao | 709/223 |
| 2006/0218521 A1* | 9/2006 | Hagstrom et al. | 717/101 |
| 2007/0266371 A1* | 11/2007 | Ramakrishnan | 717/121 |
| 2007/0277148 A1* | 11/2007 | Venolia | 717/101 |
| 2008/0127089 A1* | 5/2008 | Peretz et al. | 717/122 |
| 2008/0148234 A1* | 6/2008 | Clemm et al. | 717/121 |

OTHER PUBLICATIONS

Cubranic et al.Hipikat: A Project Memory for Software Development, IEEE Transactions on Software Engineering, Jun. 2005, pp. 446-465, Retrieved on [Nov. 16, 2012] Retrieved from the Internet: URL<http://ieeexplore.ieee.org/stamp/stamp.jsp?tp=&arnumber=1463229>.*

Zimmermann et al.Mining version histories to guide software changes, Proceedings 26th International Conference on Software engineering, May 2004, pp. 563-572, Retrieved on [Nov. 16, 2012] Retrieved from the Internet: URL<http://ieeexplore.ieee.org/stamp/stamp.jsp?tp=&arnumber=1317478>.*

* cited by examiner

*Primary Examiner* — Thuy Dao
*Assistant Examiner* — Cheneca Smith
(74) *Attorney, Agent, or Firm* — DeLizio Gilliam, PLLC (57) ABSTRACT

A method, system and computer-usable medium for automatically tracking changes in an application such as, for example, a software solution. A particular definition can be created, which is indicative of an application artifact to be tracked during the development of the application, which includes the application artifact. The particular definition can be qualified by specifying a user authorized to modify the application artifact. The user can be identified by the particular role that the user plays during the development of the application. Thereafter, modifications to the application can be automatically tracked based on the particular role that the user plays during the development of the application with respect to the application artifact, thereby permitting modifications to the application to be tracked and recorded in a comprehensive manner.

20 Claims, 7 Drawing Sheets

FIG. 6

METHOD, SYSTEM AND COMPUTER-USABLE MEDIUM FOR TRACKING AND RECORDING MODIFICATIONS TO A SOFTWARE SOLUTION

TECHNICAL FIELD

Embodiments are generally related to data-processing systems and methods. Embodiments also relate in general to the field of computers and similar technologies, and in particular to software utilized in this field. In addition, embodiments relate to techniques and systems for tracking changes made to software applications during the development of such applications.

BACKGROUND OF THE INVENTION

A software solution or application does not always perfectly suit the requirements of every user involved in the development of the particular software solution or application. Often software solutions or applications are required to be customized or configured at a client site to meet the particular requirements of a user or a group of users. Specific artifacts of the software solution must be modified or added to during the development process.

Figure 3:
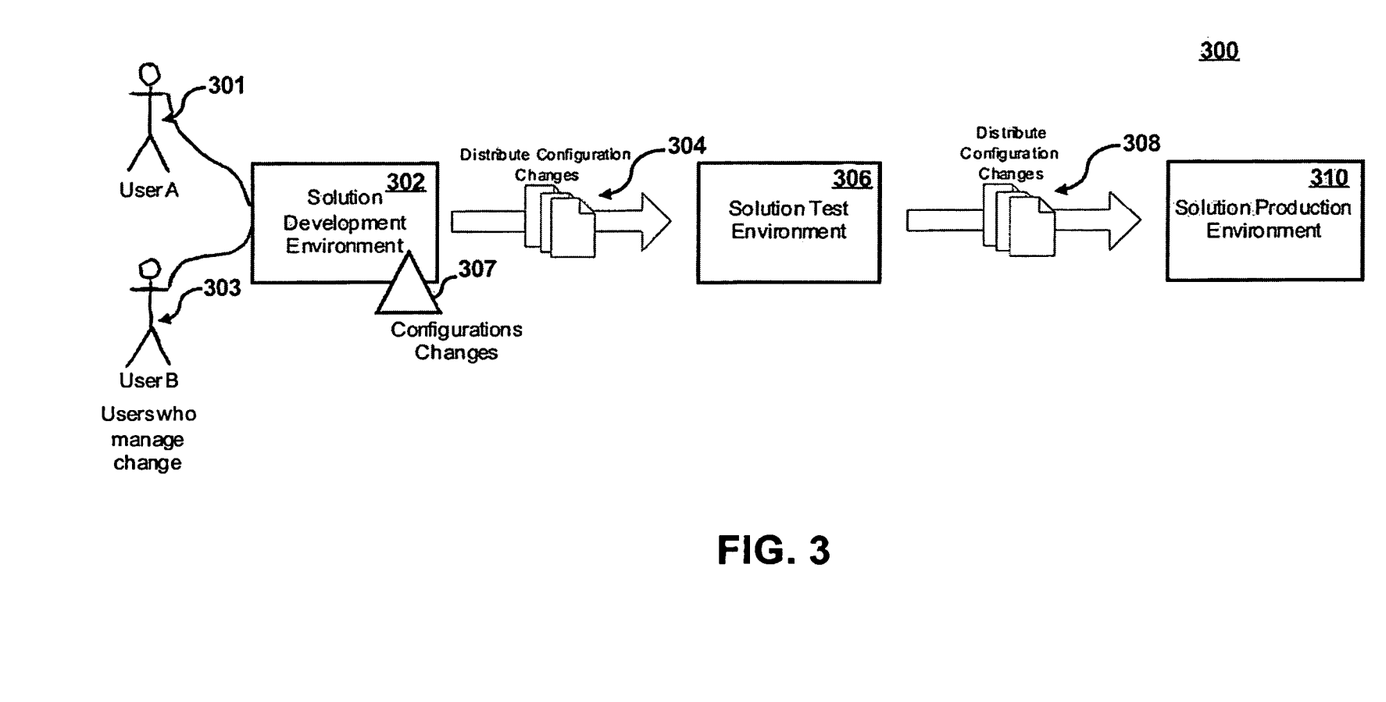
FIG. 3 illustrates a high-level block diagram illustrating a prior art system in which configuration changes are distributed to other environments.

FIG. 3 illustrates a high-level block diagram illustrating a prior art system 300 in which configuration changes are distributed to other environments. Prior art system 300 depicted in FIG. 3 represents one example of a system and/or technique that can implement an existing process in place at a customer site in order to support the identification, collection, and distribution of changes made during the creation or configuration of software solutions. Existing software solutions offer sophisticated configuration capabilities and clients can take advantage of this to create their own configurations. Users, however, are typically forced to migrate their configurations to other development, test or production environments, as indicated in the prior art configuration of system 300.

As indicated in FIG. 3, a first user 301 designated as User A and a second user 303 designated as User B are each authorized access to a solution development environment 302. The second user 303 is the user who actually manages changes to the environment. Configuration changes 307 can be made to the solution development environment 302 and then configuration changes are distributed to the software solution environment as depicted at arrow 304. A solution test environment 306 is then implemented to test such changes followed by another round of distributing the configuration changes, as indicated at block 308. Thereafter, the final solution production environment 310 is implemented. System 300 thus implies that artifacts modified or added must be distributed to other environments. Currently there does not exist, a comprehensive functionality for supporting the live tracking and capture of configuration changes and their aggregation based on the selection of artifacts for the purpose of migration.

It is thus believed that this gap can be addressed by creating a methodology, system and/or computer-usable medium for facilitating such a migration, as disclosed in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for tracking and recording changes in an application, such as a software solution.

It is an additional aspect of the present invention to provide for a comprehensive functionality that supports the live tracking and capture of configuration changes and their aggregation based on a selection of artifacts for the purpose of migration to other application environments and for facilitating such a migration.

The aforementioned aspects and other objectives and advantages can now be achieved as described herein. A method, system and computer-usable medium for automatically tracking changes in an application such as, for example, a software solution, is disclosed herein. A particular definition can be created, which is indicative of an application artifact to be tracked during the development of the application, which includes the application artifact. The particular definition can be qualified by specifying a user or a group of users authorized to modify the application artifact. The user or group of users can be identified by the particular role that the user or group of users plays during the development of the application. Thereafter, modifications to the application can be automatically tracked based on the particular role that the user plays during the development of the application with respect to the application artifact, thereby permitting modifications to the application to be tracked and recorded in a comprehensive manner.

A method, system and computer-usable medium is therefore disclosed, which can be utilized to track and record in a comprehensive manner the various changes made by specific user or a group of users in a specific area of a software solution to suit their application environment. Not only are direct changes captured, but also related changes that are effected automatically in related areas as a result of direct changes. Such an approach additionally enables specifying what areas of the software solution are to be tracked. Such an approach additionally enables specifying which specific users' changes are to be tracked.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1A:
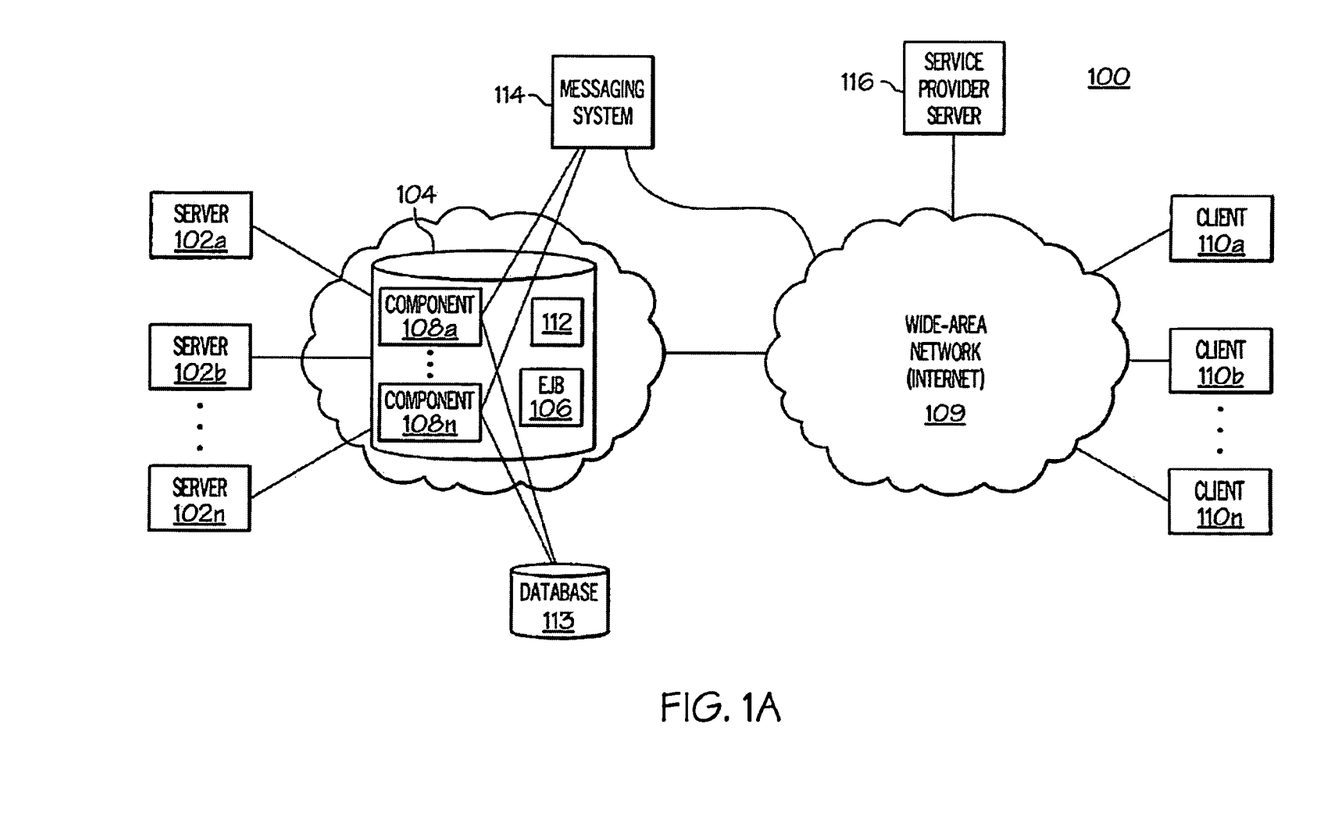
FIG. 1A illustrates a block diagram depicting an exemplary network in which a preferred embodiment of the present invention may be implemented.

Referring now to the figures, and in particular, referring to FIG. 1A, there is illustrated a block diagram depicting an exemplary network in which a preferred embodiment of the present invention may be implemented. As illustrated, network 100 includes a collection of servers 102a-n, server memory 104, wide-area network (WAN) 109, database 113, messaging system 114, and a collection of clients 110a-n. Clients 110a-n can be preferably implemented as computers with access to WAN (e.g., Internet) 109 via a network interface adapter and seek to access a service provided by servers 102a-n. It can be appreciated that network 100 represents only one example, however, of any number of networks in which a preferred embodiment may be implemented. Thus, the embodiments discussed herein are not limited to the particular implementation of network 100. In general, the disclosed embodiments can be applied to any data processing environment wherein a 3-tier architecture is being implemented. The three tiers are: client, server and database. Changes can be made by authorized users through a client. The server collects and persists these changes within a database. Servers 102a-n can access server memory 104, which may be implemented as a central or distributed memory. Server memory 104 can includes a collection of components 108a-n, such as, for example, Enterprise Java Beans 106, and connection manager 112. Enterprise Java Beans 106 can, for example, define a component architecture for deployable components (e.g., components 108a-n) and dictates the rules for interaction between components 108a-n. Again, it can be appreciated that such components may vary or may not even be utilized at all in accordance with other embodiments, but are discussed herein for general edification and illustrative purposes only.

Components 108a-n can be implemented as a code that implements a set of well-defined interfaces. Each component may be utilized by a system administrator as puzzle pieces to solve a larger problem. For example, an internet bookstore may utilize a first component as an interface for customers to input orders. An inventory component may interface with the first component to determine whether or not the orders can be filled. Connection manager 112, discussed herein in more detail in conjunction with FIG. 3, manages communication and responses to error messages between components 108a-n.

Database 113 and messaging system 114 can be implemented as external resources coupled to servers 102a-n. Database 113 may be utilized as a mass-storage server to store data generated by the processing performed by servers 102a-n. Messaging system 114, preferably implemented as Java™ Messaging Service (JMS), which can enable distributed objects (e.g., servers 102a-n and database 113) to communicate in an asynchronous, reliable manner.

Figure 1B:
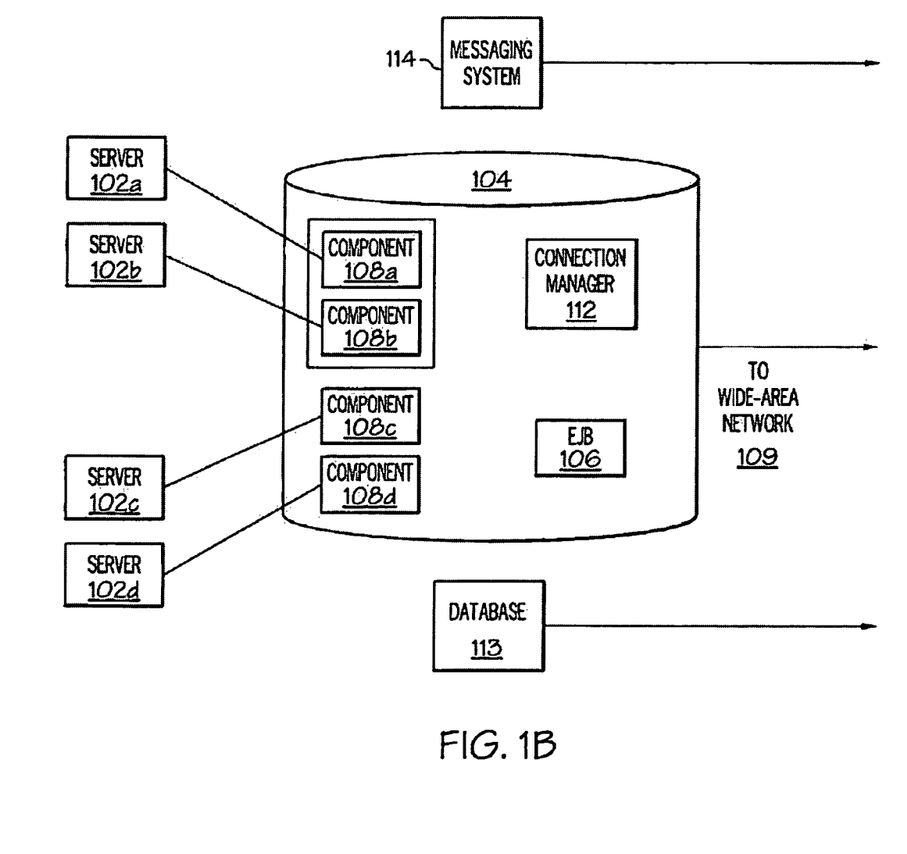
FIG. 1B illustrates a more detailed block diagram depicting an exemplary server cluster in which a preferred embodiment of the present invention may be implemented.

FIG. 1B is a more detailed block diagram depicting the relationships between servers 102a-d and components 108a-d within server memory 104 according to a preferred embodiment of the present invention. As illustrated, server 102a executes the code represented by component 108a, server 102b executes the code represented by component 108b, server 102c executes the code represented by component 108c, and server 102d executes the code represented by component 108d. Also, components 108a-b can be preferably implemented as redundant components that share the same responsibilities. For example, if server 102a fails or goes offline for any reason, the responsibilities of component 108a are forwarded to component 108b until server 102a is brought back online. Conversely, components 102c-d can be implemented as stand-alone components, depending upon design considerations. As previously discussed, messaging system 114 and database 113 are external resources coupled to servers 102a-d.

Figure 2:
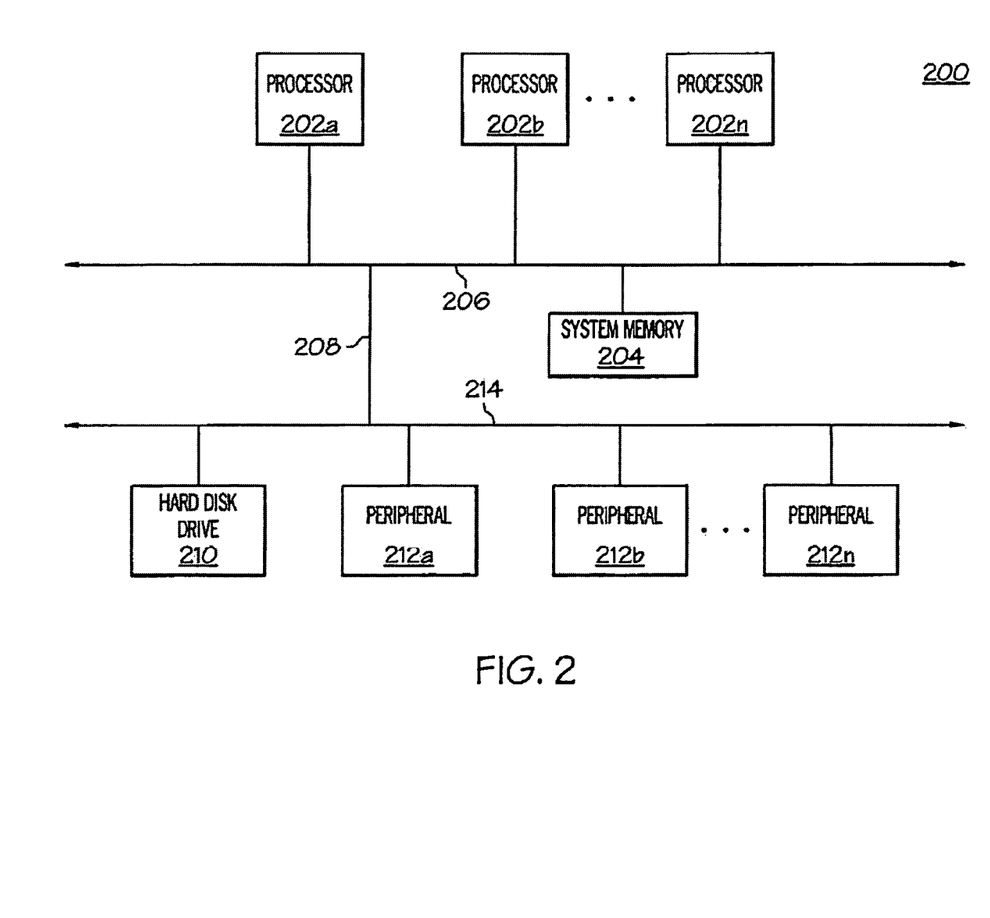
FIG. 2 is a block diagram illustrating an exemplary data processing system in which a preferred embodiment of the present invention may be implemented.

FIG. 2 illustrates a block diagram illustrating an exemplary data processing system 200 in which a preferred embodiment of the present invention may be implemented. Those with skill in the art will appreciate that data processing system 200 may be utilized to implement clients 102a-n. As depicted, exemplary data processing system 200 can include processing unit(s) 202, shown as processing units 202a and 202b in FIG. 2, which are coupled to system memory 204 via system bus 206. Preferably, system memory 204 may be implemented as a collection of dynamic random access memory (DRAM) modules. Typically, system memory 204 includes data and instructions for running a collection of applications. A mezzanine bus 208 can act as an intermediary between system bus 206 and peripheral bus 214. Those with skill in this art will appreciate that peripheral bus 214 may be implemented as a peripheral component interconnect (PCI), accelerated graphics port (AGP), or any other peripheral bus. Coupled to peripheral bus 214 is hard disk drive 210, which is utilized by data processing system 200 as a mass storage device. Also coupled to peripheral bus 214 is a collection of peripherals 212a-n.

Those skilled in the art will appreciate that data processing system 200 can include many additional components not specifically illustrated in FIG. 2. Because such additional components are not necessary for an understanding of the present invention, they are not illustrated in FIG. 2 or discussed further herein. It should also be understood, however, that the enhancements to data processing system 200 for change tracking in a software solution provided by the present invention are applicable to data processing systems of any system architecture and are in no way limited to the generalized multi-processor architecture or symmetric multi-processing (SMP) architecture illustrated in FIG. 2.

The embodiments illustrated herein provide a means for tracking and recording in a comprehensive manner, the various changes made by a specific user or a group of users in a specific area of a software solution to suit their application environment. Not only are direct changes captured but also related changes that are effected automatically in related areas as a result of direct changes. This technique additionally enables specifying what areas of the software solution are to be tracked. Such an approach additionally enables specifying which specific users' changes are to be tracked.

Consider the following change scenarios that can occur in a development environment. In one scenario, a user creates a workflow process using the software solution that encompasses a process definition, various nodes within the process, communication templates to be converted into e-mail notifications from various nodes, a number of roles played by users to whom assignments are made through the workflow process. In another scenario, a user may create a new object (e.g., a relational database table) utilizing the software solution that includes adding attributes (e.g., columns of a relational database table), keys (e.g., primary key columns of a relational database table), sequences, and so forth. In addition, the user may associate valid values to certain attributes. In another scenario, a user may create an application user interface that includes adding new forms, fields within forms and lookups to select values for individual fields. In addition, the user may design user groups who can access or modify fields and forms in the application user interface.

Figure 4:
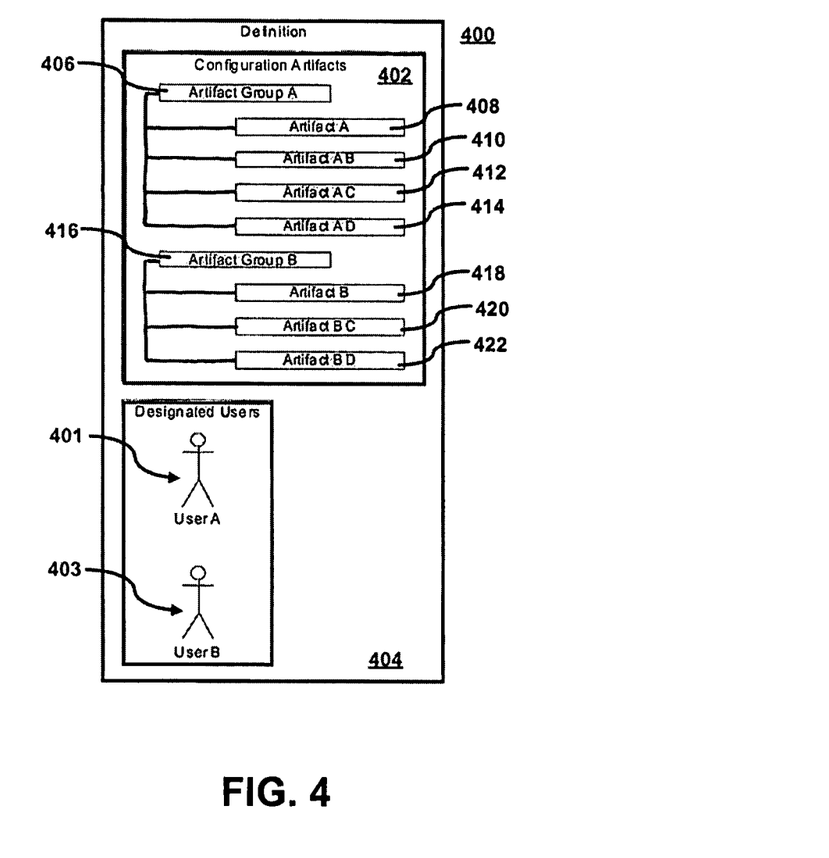
FIG. 4 illustrates a diagram depicting a configuration for defining users with respect to artifacts in order to track changes to a particular application, in accordance with a preferred embodiment.

In each of these scenarios, the user should not be burdened with the task of tracking changes and creating a list of changes to migrate. This responsibility should ideally be handled automatically. As indicated previously, prior art products and tools do not offer an automatic change tracking and recording solution that can be targeted toward changes performed by specific users. The solution described herein, on the other hand, solves this problem by creating a definition wherein a user (e.g., administrator) can specify which particular applications artifacts of the application (e.g., software solution) need to be tracked. The application artifacts may be initially bundled with the application or software solution or created by a user at the client site. There is no limitation with respect to the placement of application artifacts associated with the application. FIG. 4 illustrates such steps.

FIG. 4 illustrates a diagram depicting a configuration 400 for defining users with respect to artifacts in order to track changes to a particular application, in accordance with a preferred embodiment. It can be appreciated that configuration 400 depicted in FIG. 4 represents merely an illustrative example of the designation of configuration artifacts with respect to application development users. As indicated in FIG. 4, one or more users 401 and 403 can be defined as designated users. User 401, for example, can be specified as User A, while user 403 can be identified as User B. A definition 404 thus includes the designated users 401 and 403, and configuration artifacts 402, which can include an artifact group 406 and an artifact group 416. Artifact group 406 can be defined as Artifact Group A and can include artifacts 408, 410, 412, and 414, respectively designated as Artifact A, Artifact AB, Artifact AC, and Artifact AD. Similarly, artifact group 416 can be defined as Artifact Group B and can include artifacts, 418, 420, and 422, respectively designated as Artifact B. Artifact BC, and Artifact BD.

Thus, in the example of configuration 400 depicted in FIG. 4 the definition 404 is created wherein a user such as users 401 and/or 403 can specify which particular applications artifacts of the application (e.g., software solution) need to be tracked. In the scenario illustrated in FIG. 4, artifact groups 406 and 416 are defined for tracking purposes.

Figure 5:
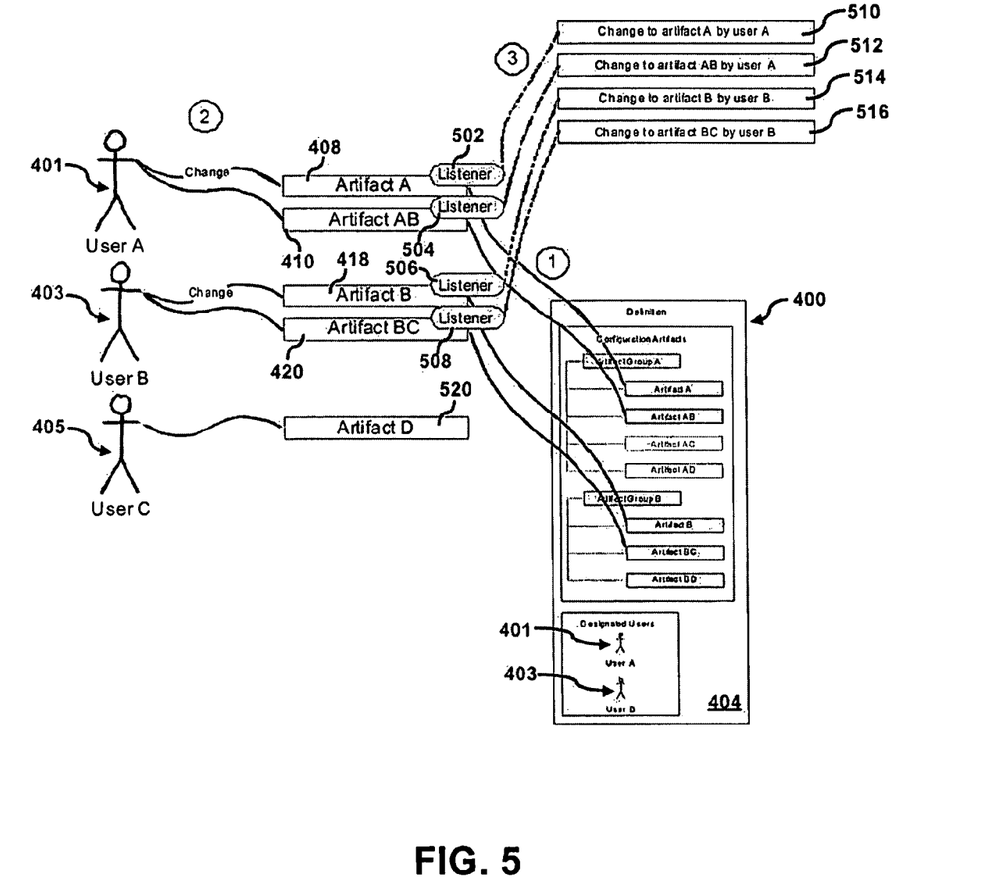
FIG. 5 illustrates a flow diagram depicting a method for tracking changes to an application, in accordance with a preferred embodiment.

FIG. 5 illustrates a flow diagram depicting a method 500 for tracking changes to an application, in accordance with alternative preferred embodiment. Note that in FIGS. 4-5, identical or similar parts or elements are generally indicated by identical reference numerals. The diagram of method 500 depicted in FIG. 5 generally illustrates how changes to a software solution or application can be captured in a live manner.

When the definition 404 is activated, a software component can be registered for each artifact included in the definition. This component can be referred to as a "listener". Examples of such listeners are listeners 502, 504, 506, and 508 illustrated in FIG. 5. In the diagram depicted method 500, this is shown as Step 1. A user such as users 401, 403, or 405 can perform changes to various artifacts of the software solution. This is shown in FIG. 5 as Step 2. Only those artifacts included in the definition are tracked. In the diagram, artifact 520 (i.e., designated as Artifact D) is not tracked because it was not included in definition 404. Changes to artifacts 408, 410, 418 and 420 are, however, tracked.

As indicated at block 510, a change can be made to Artifact A by User A. Block 512 indicates that a change can be made to Artifact AB by User A. Block 514 illustrates that a modification can be made to Artifact B by User B. while Block 516 indicates that a change can be made to Artifact BC by User B. A user 405, designated as User C is also indicated in FIG. 5 in association with Artifact D, which is not tracked.

Changes thus can include additions, modifications, and deletions. The changes performed are recorded automatically. All other end users can go about their normal activities. Once such changes are captured, the changes can be assembled together for distribution to other software solution environments.

Figure 6:
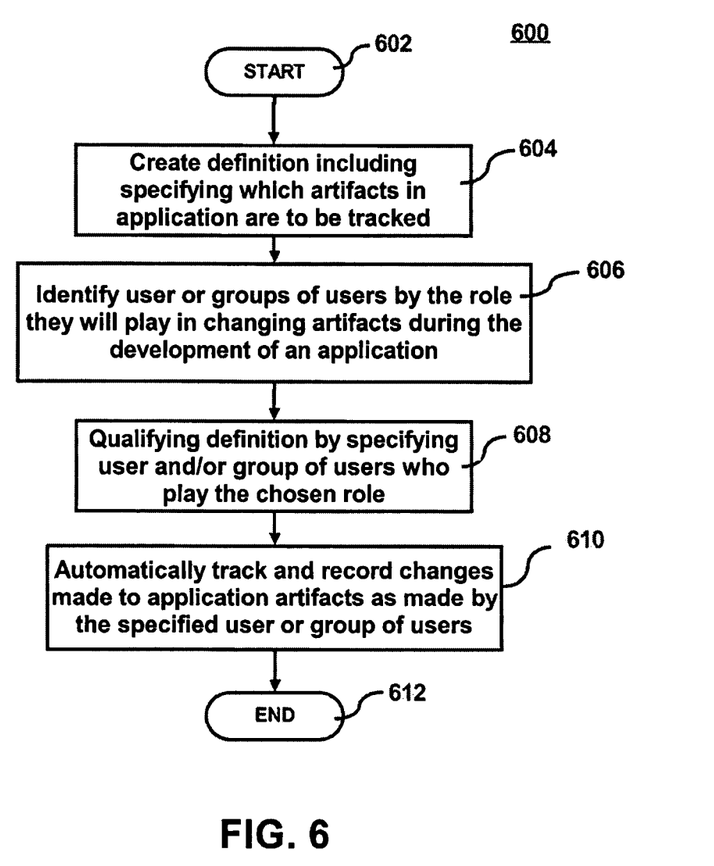
FIG. 6 illustrates a high-level logical flowchart of operations illustrating an exemplary method of change tracking in a software solution according to an alternative embodiment.

FIG. 6 illustrates a high-level logical flowchart of operations illustrating an exemplary method 600 of change tracking in a software solution according to an alternative embodiment. The method 600 represents a variation to methodology depicted in FIG. 6. The process generally begins, as indicated at block 602. Thereafter, as depicted at block 604, a particular definition can be created including one which specifies which artifacts in a particular application are to be tracked. Next, as illustrated at block 606, a user and/or groups of users can be identified by the role they will play in changing artifacts during the development of the particular application.

Next, as indicated at block 608, the definition can be qualified by the specifying the user and or group(s) of users who play the chosen role.

Thereafter, as described at block 610, an operation can be implemented for automatically tracking and recording changes made to application artifacts as made by the specified user and/or group(s) of users.

The process can thereafter terminate, as indicated at block 612.

The method 600 can be utilized to track and record in a comprehensive manner the various changes made by specific user or a group of users in a specific area of a software solution to suit their application environment. Not only are direct changes captured, but also related changes that are effected automatically in related areas as a result of direct changes. Such an approach additionally enables specifying what areas of the software solution are to be tracked. Such an approach additionally enables specifying which specific users' changes are to be tracked.

As disclosed, the present invention generally includes a method, system, and computer-usable medium for creating a particular definition indicative of an application artifact to be tracked during a development of an application that includes the application artifact; qualifying the particular definition by specifying a user authorized to modify the application artifact, wherein the user is identified by a particular role that the user plays during the development of the application; and thereafter automatically tracking a modification to the application artifact based on the particular role the user plays during the development of the application with respect to the application artifact, thereby permitting modifications to the application to be tracked and recorded in a comprehensive manner.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, the method described herein, and in particular as shown and described in FIG. 6, and the configurations illustrated in FIGS. 4-5 can be deployed as a process software from service provider server 116 to servers 102*a-n*.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implementable method, comprising:
    creating a particular definition indicative of at least a first application artifact to be tracked during a development of an application, wherein
        said application is associated with a plurality of application artifacts, and
        said plurality of application artifacts comprises said first application artifact;
    qualifying said particular definition by specifying a user authorized to modify said first application artifact, wherein said user is identified by a particular role that said user plays during said development of said application;
    registering a software component for each application artifact included in said particular definition; and
    automatically tracking a direct modification to said first application artifact and a related modification to a second application artifact, wherein said related modification results from said direct modification, utilizing said software component based on said particular role said user plays during said development of said application with respect to said first application artifact, thereby permitting modifications to said application to be tracked and recorded in a comprehensive manner.

2. The computer-implementable method of claim 1, further comprising specifying said user from among a group of users authorized to develop said application.

3. The computer-implementable method of claim 1, wherein said application comprises a software solution.

4. The computer-implementable method of claim 1, wherein said first application artifact comprises a software object.

5. The computer-implementable method of claim 1 further comprising authorizing an administrative user to specify which application artifact among said plurality of application artifacts associated with said application are required to be tracked.

6. The computer-implementable method of claim 1, further comprising initially bundling said first application artifact within said application.

7. The computer-implementable method of claim 1, further comprising permitting a user to initially create said first application artifact at a client site where said application is to be primarily utilized and processed.

8. A system, comprising:
    a processor;
    a data bus coupled to said processor; and
    a computer-usable medium embodying computer program code, said computer-usable medium being coupled to said data bus, said computer program code comprising instructions executable by said processor and configured for:
        creating a particular definition indicative of at least a first application artifact to be tracked during a development of an application, wherein said application is associated with a plurality of application artifacts, and said plurality of application artifacts comprises said first application artifact;
        qualifying said particular definition by specifying a user authorized to modify said first application artifact, wherein said user is identified by a particular role that said user plays during said development of said application;
        registering a software component for each application artifact included in said particular definition; and
        automatically tracking a direct modification to said first application artifact and a related modification to a second application artifact, wherein said related modification results from said direct modification, utilizing said software component based on said particular role said user plays during said development of said application with respect to said first application artifact, thereby permitting modifications to said application to be tracked and recorded in a comprehensive manner.

9. The system of claim 8, wherein said instructions are further configured for:
    specifying said user from among a group of users authorized to develop said application.

10. The system of claim 8, wherein said application comprises a software solution.

11. The system of claim 8, wherein said first application artifact comprises a software object.

12. The system of claim 8, wherein said instructions are further configured for:

authorizing an administrative user to specify which application artifact among said plurality of application artifacts associated with said application are required to be tracked.

13. The system of claim 8, wherein said instructions are further configured for:
permitting a user to initially create said first application artifact at a client site where said application is to be primarily utilized and processed.

14. A non-transitory computer-usable medium embodying computer program code, said computer program code comprising computer executable instructions configured for:
creating a particular definition indicative of at least a first application artifact to be tracked during a development of an application, wherein
said application is associated with a plurality of application artifacts, and
said plurality of application artifacts comprises said first application artifact;
qualifying said particular definition by specifying a user authorized to modify said first application artifact, wherein said user is identified by a particular role that said user plays during said development of said application;
registering a software component for each application artifact included in said particular definition; and
automatically tracking a direct modification to said first application artifact and a related modification to a second application artifact, wherein said related modification results from said direct modification, utilizing said software component based on said particular role said user plays during said development of said application with respect to said first application artifact, thereby permitting modifications to said application to be tracked and recorded in a comprehensive manner.

15. The computer-usable medium of claim 14, wherein said computer program code further comprises computer executable instructions configured for:
specifying said user from among a group of users authorized to develop said application.

16. The computer-usable medium of claim 14, wherein said computer program code further comprises computer executable instructions configured for:
authorizing an administrative user to specify which application artifact among said plurality of application artifacts associated with said application are required to be tracked.

17. The computer-usable medium of claim 14, wherein said computer program code further comprises computer executable instructions configured for:
initially bundling said first application artifact within said application.

18. The computer-usable medium of claim 14, wherein said computer program code further comprises computer executable instructions configured for:
permitting a user to initially create said first application artifact at a client site where said application is to be primarily utilized and processed.

19. The computer-usable medium of claim 14, wherein said computer executable instructions are deployable to a client computer from a server at a remote location.

20. The computer-usable medium of claim 14, wherein said computer executable instructions are provided by a service provider to a customer on an on-demand basis.

* * * * *